US009199309B2

(12) United States Patent
Hood

(10) Patent No.: US 9,199,309 B2
(45) Date of Patent: Dec. 1, 2015

(54) HOT ISOSTATIC PRESSING TOOL AND A METHOD OF MANUFACTURING AN ARTICLE FROM POWDER MATERIAL BY HOT ISOSTATIC PRESSING

(71) Applicant: ROLLS-ROYCE PLC, London (GB)

(72) Inventor: Christopher J. Hood, Derby (GB)

(73) Assignee: ROLLS-ROYCE plc, London (GB)

( * ) Notice: Subject to any disclaimer, the term of this patent is extended or adjusted under 35 U.S.C. 154(b) by 521 days.

(21) Appl. No.: 13/665,260

(22) Filed: Oct. 31, 2012

(65) Prior Publication Data

US 2013/0115126 A1 May 9, 2013

(30) Foreign Application Priority Data

Nov. 8, 2011 (GB) .................................. 1119238.2

(51) Int. Cl.

| | |
|---|---|
| ***B29C 43/02*** | (2006.01) |
| ***B28B 3/00*** | (2006.01) |
| ***B22F 3/15*** | (2006.01) |
| ***B30B 15/02*** | (2006.01) |

(52) U.S. Cl.

CPC ................. *B22F 3/15* (2013.01); *B30B 15/022* (2013.01); *B22F 2003/153* (2013.01)

(58) Field of Classification Search

CPC .... B22F 3/15; B22F 2003/153; B30B 15/022
USPC ........ 425/77–78, 405.1–405.2; 264/320, 317, 264/332, 221, 325
See application file for complete search history.

(56) References Cited

U.S. PATENT DOCUMENTS

| | | | | |
|---|---|---|---|---|
| 4,135,286 | A | 1/1979 | Wright et al. | |
| 4,834,917 | A | 5/1989 | Ramm et al. | |
| 5,100,867 | A | 3/1992 | Gunzelmann et al. | |
| 7,234,920 | B2 | 6/2007 | Imbourg et al. | |
| 7,575,425 | B2 * | 8/2009 | Hall et al. | 425/78 |
| 7,687,021 | B2 | 3/2010 | Imbourg et al. | |
| 7,927,085 | B2 * | 4/2011 | Hall et al. | 425/77 |

FOREIGN PATENT DOCUMENTS

| | | |
|---|---|---|
| DE | 10 2005 007 777 B4 | 6/2008 |
| JP | A-62-274006 | 11/1987 |
| JP | U-01-066597 | 4/1989 |
| JP | A-09-194905 | 7/1997 |

OTHER PUBLICATIONS

Mar. 7, 2012 British Search Report issued in British Application No. GB1119238.2.

(Continued)

*Primary Examiner* — Joseph S. Del Sole
*Assistant Examiner* — Thukhanh T Nguyen
(74) *Attorney, Agent, or Firm* — Oliff PLC

(57) ABSTRACT

A hot isostatic pressing tool includes a plurality of canister members and the hot isostatic pressing tool including at least one set of adjacent canister members. The plurality of canister members form a chamber to receive a powder material to be hot isostatically pressed. The at least one set of adjacent canister members have interlocking features forming a U-shaped, or a Z-shaped, leakage flow path between the at least one set of adjacent second canister members. The adjacent canister members are welded together to form a joint and the U-shaped, or Z-shaped, leakage flow path reduces the likelihood of failure of the welded joint during hot isostatic pressing.

23 Claims, 10 Drawing Sheets

(56) References Cited

OTHER PUBLICATIONS

Search Report issued in British Application No. 1119240.8 dated Mar. 20, 2012.

U.S. Appl. No. 13/665,383, filed Oct. 31, 2012 in the name of Christopher J. Hood.

Aug. 28, 2015 Office Action issued in U.S. Appl. No. 13/665,383.

* cited by examiner

HOT ISOSTATIC PRESSING TOOL AND A METHOD OF MANUFACTURING AN ARTICLE FROM POWDER MATERIAL BY HOT ISOSTATIC PRESSING

The present invention relates to a hot isostatic pressing tool and a method of manufacturing an article from powder material by hot isostatic pressing, e.g. HIP.

Hot isostatic pressing is a processing technique in which high isostatic pressure is applied to a powder material contained in a sealed and evacuated canister at a high temperature to produce a substantially 100% dense article. The industry standard is to manufacture the canisters used in the hot isostatic pressing process from mild steel sheet, approximately 3 mm thick. The canister conventionally used comprises a plurality of separate portions which are joined together by welded joints to form the completed canister. During the hot isostatic pressing cycle, the canister collapses as a result of the high gas pressures and high temperatures applied and results in compaction, or consolidation, of the powder material. The collapsing of the canister is sometimes uneven and this may result in distortion of the canister and uneven compaction, or consolidation, of the powder material and ultimately a distorted article at the end of the hot isostatic pressing cycle.

During the hot isostatic pressing cycle there is a problem in that one or more of the welded joints between portions of the canister may fail. A failure of a welded joint may be due to poor welding or a low packing density of the powder within the canister, which induces an increase in tension in the welded joint and leads to its failure. A failure of a welded joint is difficult to assess immediately after the hot isostatic pressing cycle. This is due to the fact that if the welded joint fails during the early part of the hot isostatic pressing cycle any crack generated is subsequently resealed as the hot isostatic pressing cycle continues, because the crack is resealed by a diffusion bonding process. The result of a failure of a welded joint is that the resulting article is not 100% dense. This is established by non destructive examination, NDE, of one of the tubes used for filling the canister e.g. by analysing the argon content within the filling tube, because if the welded joint fails during the hot isostatic pressing cycle the argon, or other inert gas, used is able to enter the canister.

Accordingly the present invention seeks to provide a hot isostatic pressing tool and a method of manufacturing an article from powder material by hot isostatic pressing which reduces, preferably overcomes, the above mentioned problem.

Accordingly the present invention provides a hot isostatic pressing tool comprising a plurality of canister members, the hot isostatic pressing tool comprising at least one set of adjacent canister members, the plurality of canister members forming a chamber to receive a powder material to be hot isostatically pressed, the at least one set of adjacent canister members having interlocking features forming a U-shaped or a Z-shaped leakage flow path between the at least one set of adjacent canister members.

Each set of adjacent canister members may have interlocking features forming a U-shaped or a Z-shaped leakage flow path between each set of adjacent canister members.

The at least one set of adjacent canister members may have interlocking features forming a series of Z-shaped leakage flow paths between the at least one set of adjacent canister members.

The hot isostatic pressing tool may comprise an inner cylindrical canister member, an outer cylindrical canister member, a first end ring and a second end ring, the outer cylindrical canister member being spaced radially outwardly from the inner cylindrical canister member to form the chamber to receive a powder material to be hot isostatically pressed, the first end ring and a first end of the inner cylindrical canister member having interlocking features forming a U-shaped or a Z-shaped leakage flow path between the first end ring and the first end of the inner cylindrical canister member, the second end ring and a second end of the inner cylindrical canister member having interlocking features forming a U-shaped or a Z-shaped leakage flow path between the second end ring and the second end of the inner cylindrical canister member, the first end ring and a first end of the outer cylindrical canister member having interlocking features forming a U-shaped or a Z-shaped leakage flow path between the first end ring and the first end of the outer cylindrical canister member, the second end ring and a second end of the outer cylindrical canister member having interlocking features forming a U-shaped or a Z-shaped leakage flow path between the second end ring and the second end of the outer cylindrical canister member.

The interlocking features of the first end ring and a first end of the inner cylindrical canister member may comprise an annular axially extending projection on the inner cylindrical canister member and an annular groove in the first end ring.

The interlocking features may form a series of Z-shaped leakage flow paths between the first end ring and the first end of the inner cylindrical canister member.

The interlocking features of the second end ring and a second end of the inner cylindrical canister member may comprise an annular axially extending projection on the inner cylindrical canister member and an annular groove in the second end ring.

The interlocking features may form a series of Z-shaped leakage flow paths between the second end ring and the second end of the inner cylindrical canister member.

The interlocking features of the first end ring and the first end of the outer cylindrical canister member may comprise an annular axially extending projection on the first end ring and an annular groove in the first end of the outer cylindrical canister member.

The interlocking features may form a U-shaped leakage flow path between the first end ring and the first end of the outer cylindrical canister member.

The interlocking features of the second end ring and the second end of the outer cylindrical canister member may comprise an annular axially extending projection on the second end ring and an annular groove in the second end of the outer cylindrical canister member.

The interlocking features may form a U-shaped leakage flow path between the second end ring and the second end of the outer cylindrical canister member.

The first end of the inner cylindrical canister member may have a radially inwardly extending membrane abutting the first end ring.

The second end of the inner cylindrical canister member may have a radially inwardly extending membrane abutting the second end ring.

The first end of the outer cylindrical canister member may have a radially outwardly and axially extending membrane abutting the annular projection on the first end ring.

The second end of the outer cylindrical canister member may have a radially outwardly and axially extending membrane abutting the annular projection on the second end ring.

The first end ring may be hollow and define a sub chamber interconnected with the chamber to receive the powder material to be hot isostatically pressed.

The second end ring may be hollow and define a sub chamber interconnected with the chamber to receive the powder material to be hot isostatically pressed.

The first end ring may have an annular portion extending in a radially inward direction, the radially inner diameter of the annular portion is less than the radially inner diameter of the inner cylindrical canister member.

The second end ring may have an annular portion extending in a radially inward direction, the radially inner diameter of the annular portion is less than the radially inner diameter of the inner cylindrical canister member.

The hot isostatic pressing tool may comprise a cylindrical canister member, a first end member and a second end member, the cylindrical canister member forming the chamber to receive a powder material to be hot isostatically pressed, the first end member and a first end of the cylindrical canister member having interlocking features forming a U-shaped or a Z-shaped leakage flow path between the first end member and the first end of the cylindrical canister member, the second end member and a second end of the cylindrical canister member having interlocking features forming a U-shaped or a Z-shaped leakage flow path between the second end member and the second end of the cylindrical canister member.

The present invention also provides a method of manufacturing an article from powder material by hot isostatic pressing, the method comprising the steps of: a) forming a plurality of canister members, b) providing interlocking features on an at least one set of adjacent canister members, the interlocking features forming a U-shaped or a Z-shaped leakage flow path between the at least one set of adjacent canister members, c) sealing the canister members together to form a hot isostatic pressing tool, d) supplying powder material into a chamber defined between the plurality of canister members of the hot isostatic pressing tool, e) evacuating gases from the chamber and then sealing the chamber, f) applying heat and pressure to consolidate the powder material within the chamber of the hot isostatic pressing tool to form a consolidated powder material article and g) removing the hot isostatic pressing tool from the consolidated powder material article.

Step a) may comprise forming an inner cylindrical canister member, forming an outer cylindrical canister member, forming a first end ring, forming a second end ring and arranging the outer cylindrical canister member such that it is spaced radially outwardly from the inner cylindrical canister member to form the chamber, step b) comprises providing the first end ring and a first end of the inner cylindrical canister member with interlocking features forming a U-shaped or a Z-shaped leakage flow path between the first end ring and the first end of the inner cylindrical canister member, providing the second end ring and a second end of the inner cylindrical canister member with interlocking features forming a U-shaped or a Z-shaped leakage flow path between the second end ring and the second end of the inner cylindrical canister member, providing the first end ring and a first end of the outer cylindrical canister member with interlocking features forming a U-shaped or a Z-shaped leakage flow path between the first end ring and the first end of the outer cylindrical canister member and providing the second end ring and a second end of the outer cylindrical canister member with interlocking features forming a U-shaped or a Z-shaped leakage flow path between the second end ring and the second end of the outer cylindrical canister member, step c) comprises sealing the first end ring to the first end of the inner cylindrical canister member, sealing the second end ring to the second end of the inner cylindrical canister member, sealing the first end ring to the first end of the outer cylindrical canister member and sealing the second end ring to the second end of the outer cylindrical canister member to form a hot isostatic pressing tool, and step d) comprises supplying powder material into the chamber between the inner cylindrical canister member and the outer cylindrical canister member of the hot isostatic pressing tool.

The consolidated powder material article may be a casing.

The casing may be a gas turbine engine casing.

The casing may be a turbine casing, a compressor casing, a fan casing or a combustion casing.

Step a) may comprise forming a cylindrical canister member, forming a first end member and forming a second end member, step b) comprises providing the first end member and a first end of the cylindrical canister member with interlocking features forming a U-shaped or a Z-shaped leakage flow path between the first end member and the first end of the cylindrical canister member, providing the second end member and a second end of the cylindrical canister member with interlocking features forming a U-shaped or a Z-shaped leakage flow path between the second end member and the second end of the cylindrical canister member, step c) comprise sealing the first end member to the first end of the cylindrical canister member and sealing the second end member to the second end of the cylindrical canister member to form a hot isostatic pressing tool, and step d) comprises supplying powder material into a chamber defined between the cylindrical canister member, the first end member and the second end member of the hot isostatic pressing tool.

The powder material may comprise a powder metal or a powder alloy.

The powder alloy may comprise a nickel base superalloy, a titanium alloy, a steel alloy.

The method may comprise supplying different powder alloys, or different powder metals, into different regions of the chamber.

The present invention will be more fully described by way of example with reference to the accompanying drawings, in which.

Figure 7:
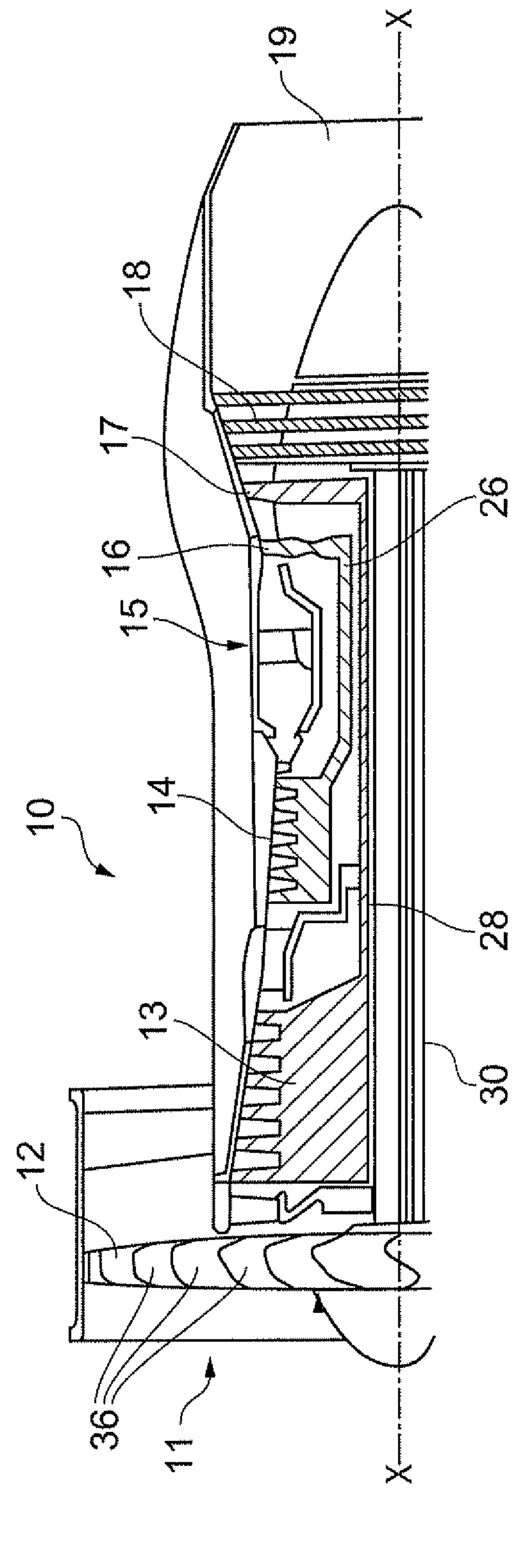
FIG. 7 is a turbofan gas turbine engine having a casing manufactured from powder material by hot isostatic pressing according to the present invention.

A turbofan gas turbine engine 10, as shown in FIG. 7, comprises in flow series an intake 11, a fan 12, an intermediate pressure compressor 13, a high pressure compressor 14, a combustor 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 14 via a second shaft 28 and the low pressure turbine 19 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustor 15. Fuel is injected into the combustor 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

The fan 12, the intermediate pressure compressor 13, the high pressure compressor 14, the combustor 15, the high pressure turbine 16, the intermediate pressure turbine 17 and the low pressure turbine 18 are each enclosed by a respective casing.

Figure 8:
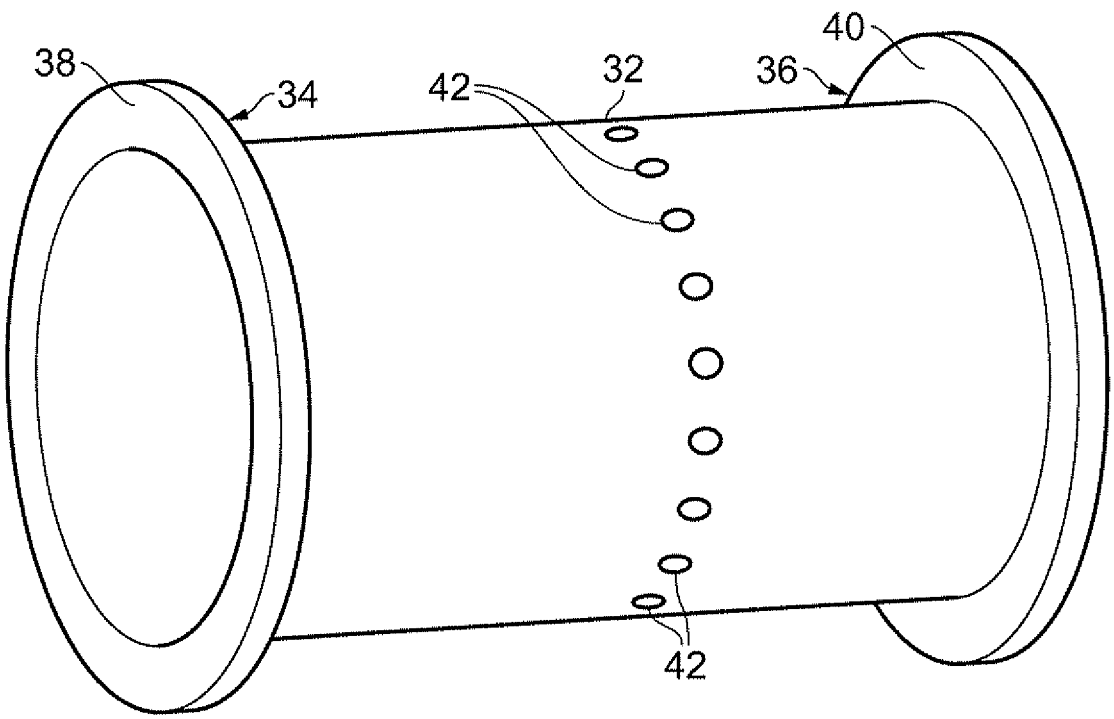
FIG. 8 is an enlarged perspective view of the casing shown in FIG. 7.

A combustor casing 32 is shown more clearly in FIG. 8 and the combustor casing 32 comprises an annular radially outwardly extending flange 38 at an upstream end 34 of the combustor casing 32 and an annular radially outwardly extending flange 40 at a downstream end 36 of the combustor casing 32. The flanges 38 and 40 enable the combustor casing 32 to be secured to a casing of the adjacent high pressure compressor 14 and a casing of the high pressure turbine 16. The combustor casing 14 also has a plurality of circumferentially spaced apertures 42, which have associated bosses and threaded blind holes, to allow fuel injectors 44 to be inserted into the combustion chamber 15.

The combustor casing 32 is manufactured by hot isostatic pressing of a powder material, e.g. a powder metal or powder alloy. The powder alloy may be a nickel-base superalloy.

Figure 1:
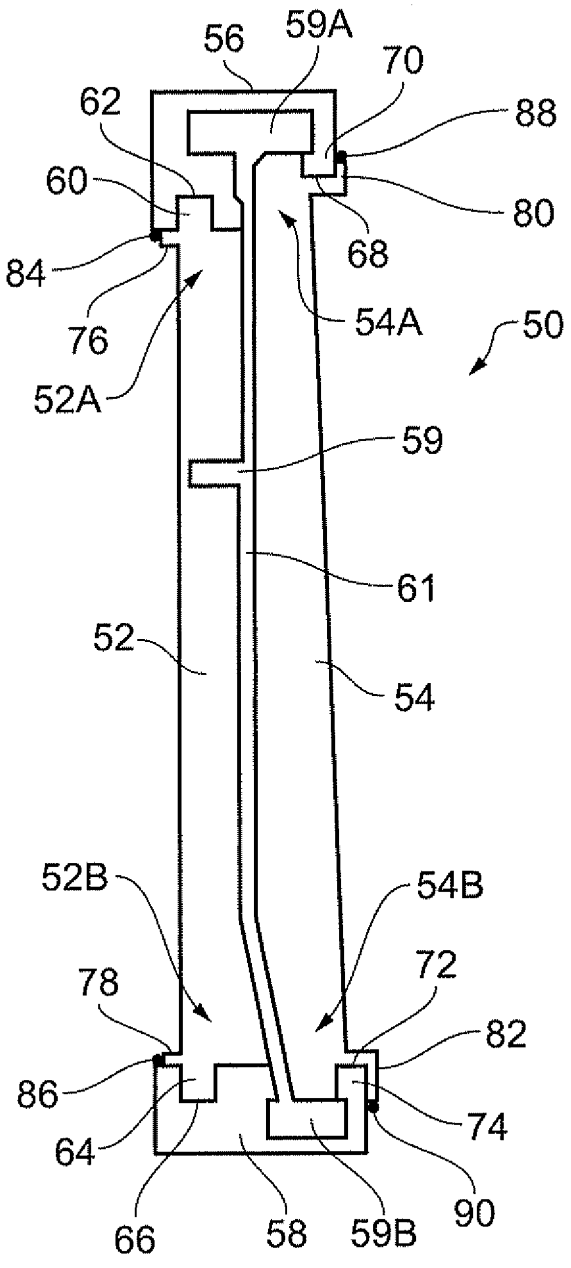
FIG. 1 is a longitudinal cross-sectional view through half of a hot isostatic pressing tool according to the present invention.

The combustor casing 32 is manufactured using a hot isostatic pressing tool 50 as shown in FIG. 1. The hot isostatic pressing tool 50 comprises a plurality of canister members 52, 54, 56 and 58 and the hot isostatic pressing tool 50 comprises at least one set of adjacent canister members. In this case a first end 52A of canister member 52 is adjacent canister member 56 and a second end 52B of canister member 52 is adjacent canister member 58. Similarly a first end 54A of canister member 54 is adjacent canister member 56 and a second end 54B of canister member 54 is adjacent canister member 58. The plurality of canister members 52, 54, 56 and 58 form, or define, a chamber 59 to receive a powder material 61 to be hot isostatically pressed. The at least one set of adjacent canister members 52, 54, 56 and 58 having interlocking features forming a U-shaped or a Z-shaped leakage flow path between the at least one set of adjacent second canister members. In this case each set of adjacent canister members has interlocking features forming a U-shaped or a Z-shaped leakage flow path between each set of adjacent canister members. In this case the first end 52A of canister member 52 and the adjacent canister member 56 have interlocking features 60 and 62 respectively and the second end 52B of canister member 52 and the adjacent canister member 58 have interlocking features 64 and 66 respectively. The first end 54A of canister member 54 and the adjacent canister member 56 have interlocking features 68 and 70 respectively and the second end 54B of canister member 54 and the adjacent canister member 58 have interlocking features 72 and 74 respectively.

The hot isostatic pressing tool 50 actually comprises an inner cylindrical canister member 52, an outer cylindrical canister member 54, a first end ring 56 and a second end ring 58. The outer cylindrical canister member 54 is spaced radially outwardly from the inner cylindrical canister member 53 to form the chamber 59 to receive the powder material 61 to be hot isostatically pressed. The first end ring 56 and the first end 52A of the inner cylindrical canister member have interlocking features 60 and 62 forming a U-shaped or a Z-shaped leakage flow path between the first end ring 56 and the first end 52A of the inner cylindrical canister member 52. Likewise the second end ring 58 and the second end 52B of the inner cylindrical canister member 52 have interlocking features 64, 66 forming a U-shaped or a Z-shaped leakage flow path between the second end ring 58 and the second end 52B of the inner cylindrical canister member 52. The first end ring 56 and the first end 54A of the outer cylindrical canister member 54 have interlocking features 68 and 70 forming a U-shaped or a Z-shaped leakage flow path between the first end ring 56 and the first end 54A of the outer cylindrical canister member 54. Likewise the second end ring 58 and a second end 54B of the outer cylindrical canister member 54 have interlocking features 72 and 74 forming a U-shaped or a Z-shaped leakage flow path between the second end ring 58 and the second end 54B of the outer cylindrical canister member 54.

The interlocking features of the first end ring 56 and the first end 52A of the inner cylindrical canister member 52 comprise an annular axially extending projection 60 on the inner cylindrical canister member 52 and an annular groove 62 in the first end ring 56. The interlocking features 60 and 62 form a series of Z-shaped leakage flow paths between the first end ring 56 and the first end 52A of the inner cylindrical canister member 52. The first end 52A of the inner cylindrical canister member 52 has a radially inwardly extending membrane 76 abutting the first end ring 56.

The interlocking features of the second end ring 58 and the second end 52B of the inner cylindrical canister member 52 comprise an annular axially extending projection 64 on the inner cylindrical canister member 52 and an annular groove 66 in the second end ring 58. The interlocking features 64 and 66 form a series of Z-shaped leakage flow paths between the second end ring 58 and the second end 52B of the inner cylindrical canister member 52. The second end 52B of the inner cylindrical canister member 52 has a radially inwardly extending membrane 78 abutting the second end ring 58.

The interlocking features of the first end ring 56 and the first end 54A of the outer cylindrical canister member 54 comprise an annular axially extending projection 70 on the first end ring 56 and an annular groove 68 in the first end 54A of the outer cylindrical canister member 54. The interlocking features form a U-shaped leakage flow path between the first end ring 56 and the first end 54A of the outer cylindrical canister member 54. The first end 54A of the outer cylindrical canister member 54 has a radially outwardly and axially extending membrane 80 abutting the annular projection 70 on the first end ring 56. The membrane 80 partially defines the annular groove 68.

The interlocking features of the second end ring 58 and the second end 54B of the outer cylindrical canister member 54 comprise an annular axially extending projection 74 on the second end ring 58 and an annular groove 72 in the second end 54B of the outer cylindrical canister member 54. The interlocking features form a U-shaped leakage flow path between the second end ring 58 and the second end 54B of the outer cylindrical canister member 54. The second end 54B of the outer cylindrical canister member 54 has a radially outwardly and axially extending membrane 82 abutting the annular projection 74 on the second end ring 58. The membrane 82 partially defines the annular groove 72.

The first end ring 56 is hollow and defines a sub chamber 59A interconnected with the chamber 59 to receive the powder material 61 to be hot isostatically pressed. The second end ring 58 is hollow and defines a sub chamber 59B interconnected with the chamber 59 to receive the powder material 61 to be hot isostatically pressed.

The combustor casing 32 is manufactured from powder alloy by hot isostatic pressing, The method comprises the steps of: a) forming a plurality of canister members 52, 54, 56 and 58, b) providing interlocking features 60, 62, 64, 66, 68, 70 and 72 on an at least one set of adjacent canister members 52, 54, 56 and 58, the interlocking features forming a U-shaped or a Z-shaped leakage flow path between the at least one set of adjacent canister members 52, 54, 56 and 58, c) sealing the canister members 52, 54, 56 and 58 together to form the hot isostatic pressing tool 50, d) supplying powder alloy 61 into the chamber 59, 59A and 59B defined between the plurality of canister members 52, 54, 56 and 58 of the hot isostatic pressing tool 50, e) evacuating gases from the chamber 59, 59A and 59B and then sealing the chamber 59, 59A and 59B, f) applying heat and pressure to consolidate the powder alloy within the chamber 59, 59A and 59B of the hot isostatic pressing tool 50 to form a consolidated powder alloy combustor casing 32 and g) removing the hot isostatic pressing tool 50 from the consolidated powder alloy combustor casing 32.

Step a) comprises forming an inner cylindrical canister member 52, forming an outer cylindrical canister member 54, forming a first end ring 56, forming a second end ring 56 and arranging the outer cylindrical canister member 54 such that it is spaced radially outwardly from the inner cylindrical canister member 52 to form the chamber 59. Step b) comprises providing the first end ring 56 and the first end 52A of the inner cylindrical canister member 52 with interlocking features 60 and 62 forming a U-shaped or a Z-shaped leakage flow path between the first end ring 56 and the first end 52A of the inner cylindrical canister member 52, providing the second end ring 58 and the second end 52B of the inner cylindrical canister member 52 with interlocking features 64 and 66 forming a U-shaped or a Z-shaped leakage flow path between the second end ring 58 and the second end 52A of the inner cylindrical canister member 52, providing the first end ring 56 and the first end 54A of the outer cylindrical canister member 54 with interlocking features 68 and 70 forming a U-shaped or a Z-shaped leakage flow path between the first end ring 56 and the first end 54A of the outer cylindrical canister member 54 and providing the second end ring 58 and the second end 54B of the outer cylindrical canister member 54 with interlocking features 72 and 74 forming a U-shaped or a Z-shaped leakage flow path between the second end ring 58 and the second end 54B of the outer cylindrical canister member 54. Step c) comprises sealing 84 the first end ring 56 to the first end 52A of the inner cylindrical canister member 52, sealing 86 the second end ring 58 to the second end 52B of the inner cylindrical canister member 52, sealing 88 the first end ring 56 to the first end 54A of the outer cylindrical canister member 54 and sealing 90 the second end ring 58 to the second end 54B of the outer cylindrical canister member 54 to form the hot isostatic pressing tool 50. Step d) comprises supplying powder alloy 61 into the chamber 59, 59A and 59B between the inner cylindrical canister member 52 and the outer cylindrical canister member 54 of the hot isostatic pressing tool 50.

The sealing 84, 86, 88 and 90 of the canister members 52, 54, 56 and 58 comprises welding, e.g. TIG welding or other suitable welding technique. The seal 84 between the first end ring 56 and the first end 52A of the inner cylindrical canister member 52 is at the radially inner end of the radially inwardly extending membrane 76 at the first end 52A of the inner cylindrical canister member 52. The seal 86 between the second end ring 58 and the second end 52B of the inner cylindrical canister member 52 is at the radially inner end of the radially inwardly extending membrane 78 at the second end 52B of the inner cylindrical canister member 52.

The seal 88 between the first end ring 56 and the first end 54A of the outer cylindrical canister member 54 is at the radially outer and axially upstream end of the radially outwardly and axially extending membrane 80 at the first end 54A of the outer cylindrical canister member 54. The seal 90 between the second end ring 58 and the second end 54B of the outer cylindrical canister member 54 is at the radially outer and axially downstream end of the radially outwardly and axially extending membrane 82 at the second end 54B of the outer cylindrical canister member 54. Each of the seals, welds, 84, 86, 88 and 90 is an annular weld.

The canister members 52, 54, 56 and 58 are formed by machining forged mild steel rings which are then assembled to form the hot isostatic pressing tool 50. Prior to the hot isostatic pressing cycle the canister member 52, 54, 56 and 58 are cleaned, assembled and welded together to form a gas tight seal. The assembled canister members 52, 54, 56 and 58 form a plurality of U-shaped, or a Z-shaped, leakage flow paths which provide a longer and more tortuous route for a gas to enter the hot isostatic pressing tool 50. The interlocking features 60, 62, 64, 66, 68, 70, 72 and 74 provide extra support between the canister members 52, 54, 56 and 58 of the hot isostatic pressing tool 50. In addition the membranes 76, 78, 80 and 82 of the hot isostatic pressing tool 50 are arranged such that the high pressure within the hot isostatic pressing vessel acts on the membranes 76, 78, 80 and 82 of hot isostatic pressing tool 50 to press them against the adjacent first end ring 56 and adjacent second ring 54 to provide an ability to self seal. The interlocking features 60, 62, 64, 66, 68, 70, 72 and 74 and the adjacent flat faces reduce the tensioning effect on the fillet welds 84, 86, 88 and 90. The fillet welds 84, 86, 88 and 90 can be used in the configuration of the present invention because of the association and support of the interlocking features 60, 62, 64, 66, 68, 70, 72 and 74.

Alternative forms of interlocking features may be used such as mortise and tenon, dovetail, dowels, studs, however it is considered that fully annular interlocking features are preferred because these provide maximum support and interlock capability.

The hot isostatic pressing cycle uses temperature of up to 1200° C. and a pressure of up to 150 MPa.

Figure 2:
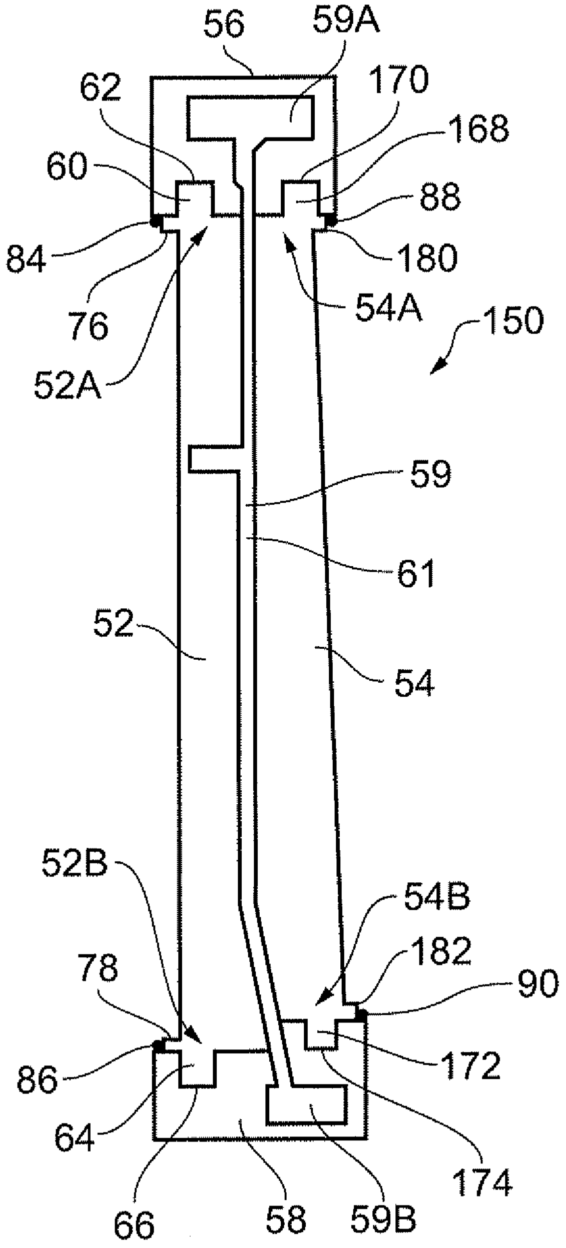
FIG. 2 is a longitudinal cross-sectional view through half of a further hot isostatic pressing tool according to the present invention.

The combustor casing 32 may be manufactured using a hot isostatic pressing tool 150 as shown in FIG. 2. The hot isostatic pressing tool 150 is substantially the same as that shown in FIG. 1 and like parts are denoted by like numerals. The hot isostatic pressing tool 150 differs from that in FIG. 1 in that the interlocking features of the first end ring 56 and the first end 54A of the outer cylindrical canister member 54 comprise an annular groove 170 in the first end ring 56 and an axially extending projection 168 on the first end 54A of the outer cylindrical canister member 54. The interlocking features form a series of Z-shaped leakage flow paths between the first end ring 56 and the first end 54A of the outer cylindrical canister member 54. The first end 54A of the outer cylindrical canister member 54 has a radially outwardly extending membrane 180 abutting the first end ring 56. The interlocking features of the second end ring 58 and the second end 54B of the outer cylindrical canister member 54 comprise an annular groove 174 in the second end ring 58 and an axially extending projection 172 on the second end 54B of the outer cylindrical canister member 54. The interlocking features form a series of Z-shaped leakage flow paths between the second end ring 58 and the second end 54B of the outer cylindrical canister member 54. The second end 54B of the outer cylindrical canister member 54 has a radially outwardly extending membrane 182 abutting the second end ring 56.

Figure 3:
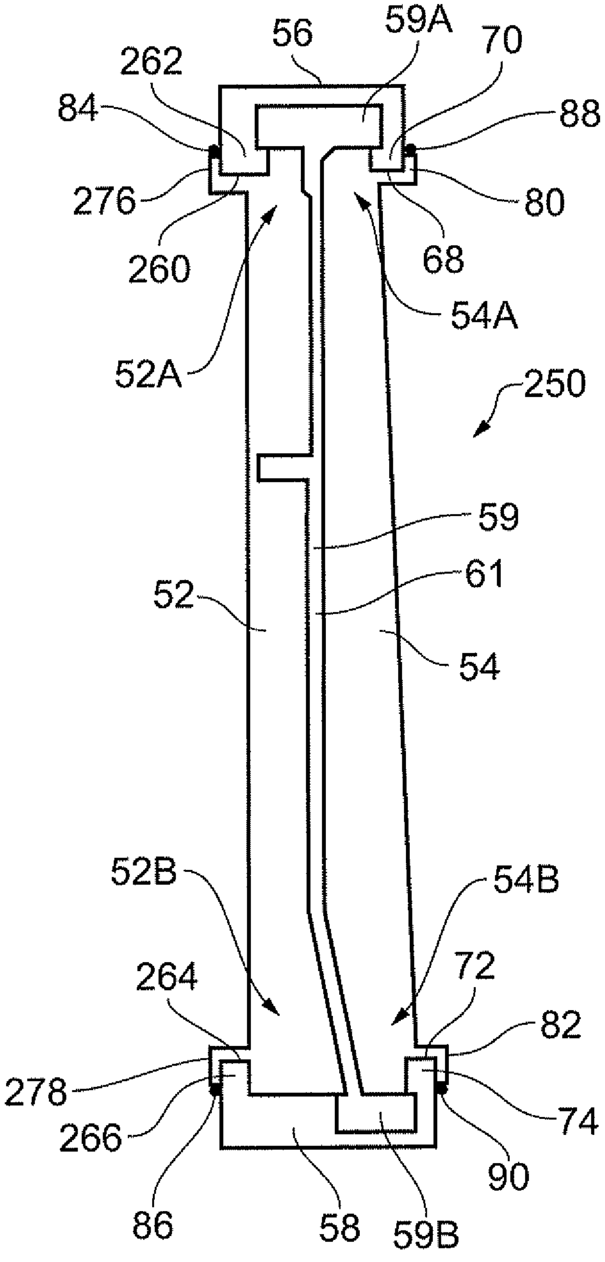
FIG. 3 is a longitudinal cross-sectional view through half of another hot isostatic pressing tool according to the present invention.

The combustor casing 32 may be manufactured using a hot isostatic pressing tool 250 as shown in FIG. 3. The hot isostatic pressing tool 250 is substantially the same as that shown in FIG. 1 and like parts are denoted by like numerals. The hot isostatic pressing tool 250 differs from that in FIG. 1 in that the interlocking features of the first end ring 56 and the first end 52A of the inner cylindrical canister member 52 comprise an annular groove 260 on the inner cylindrical canister member 52 and an annular axially extending projection 262 on the first end ring 56. The interlocking features 260 and 262 form a U-shaped leakage flow paths between the first end ring 56 and the first end 52A of the inner cylindrical canister member 52. The first end 52A of the inner cylindrical canister member 52 has a radially inwardly and axially extending membrane 276 abutting the annular projection 262 on the first second end ring 56. The interlocking features of the second end ring 58 and the second end 52B of the inner cylindrical canister member 52 comprise an annular groove 264 on the inner cylindrical canister member 52 and an annular axially extending projection 266 on the second end ring 58. The interlocking features 264 and 266 form a U-shaped leakage flow paths between the first end ring 56 and the second end 52B of the inner cylindrical canister member 52. The second end 52B of the inner cylindrical canister member 52 has a radially inwardly and axially extending membrane 278 abutting the annular projection 266 on the second end ring 58.

Figure 4:
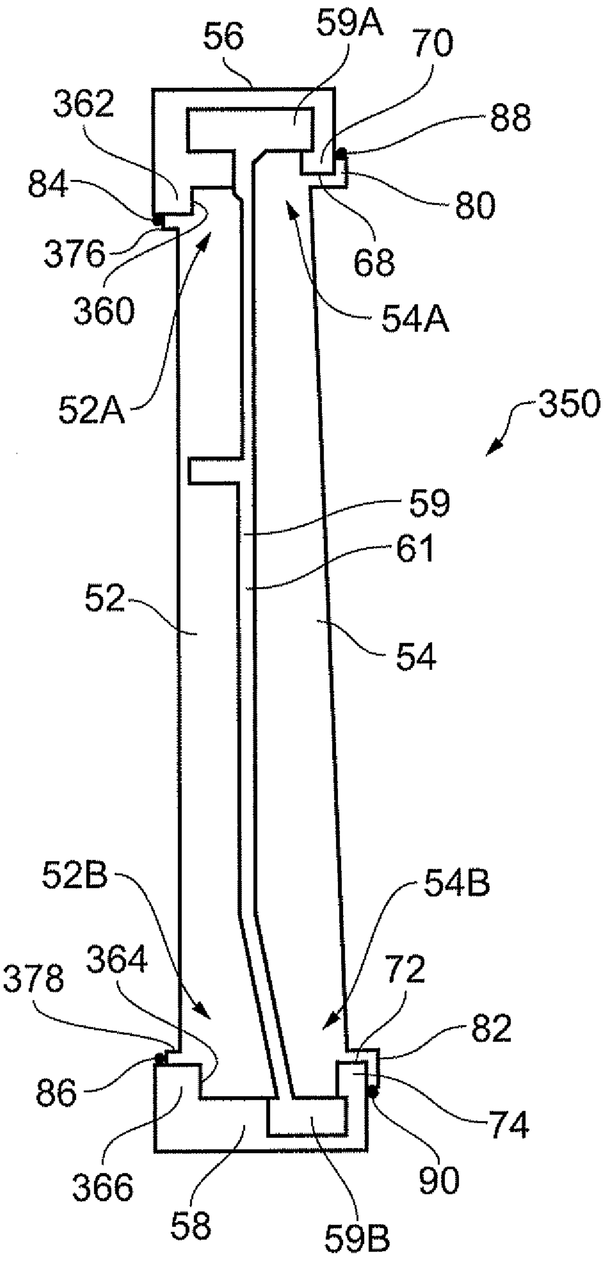
FIG. 4 is a longitudinal cross-sectional view through half of an alternative hot isostatic pressing tool according to the present invention.

The combustor casing 32 may be manufactured using a hot isostatic pressing tool 350 as shown in FIG. 4. The hot isostatic pressing tool 350 is substantially the same as that shown in FIG. 1 and like parts are denoted by like numerals. The hot isostatic pressing tool 350 differs from that in FIG. 1 in that the interlocking features of the first end ring 56 and the first end 52A of the inner cylindrical canister member 52 comprise an annular ledge 360 on the radially inner surface of the inner cylindrical canister member 52 and an annular axially extending projection 362 on the first end ring 56. The annular axially extending projection 362 rests on the annular ledge 360. The interlocking features 360 and 362 form a Z-shaped leakage flow paths between the first end ring 56 and the first end 52A of the inner cylindrical canister member 52. The first end 52A of the inner cylindrical canister member 52 has a radially inwardly and axially extending membrane 376 abutting the annular projection 72 on the first end ring 56. The interlocking features of the second end ring 58 and the second end 52B of the inner cylindrical canister member 52 comprise an annular ledge 364 on the radially inner surface of the inner cylindrical canister member 52 and an annular axially extending projection 366 on the second end ring 58. The annular axially extending projection 366 rests on the annular ledge 364. The interlocking features 364 and 366 form a Z-shaped leakage flow paths between the second end ring 58 and the second end 52B of the inner cylindrical canister member 52. The second end 52B of the inner cylindrical canister member 52 has a radially inwardly and axially extending membrane 378 abutting the annular projection 366 on the second end ring 58.

Figure 5:
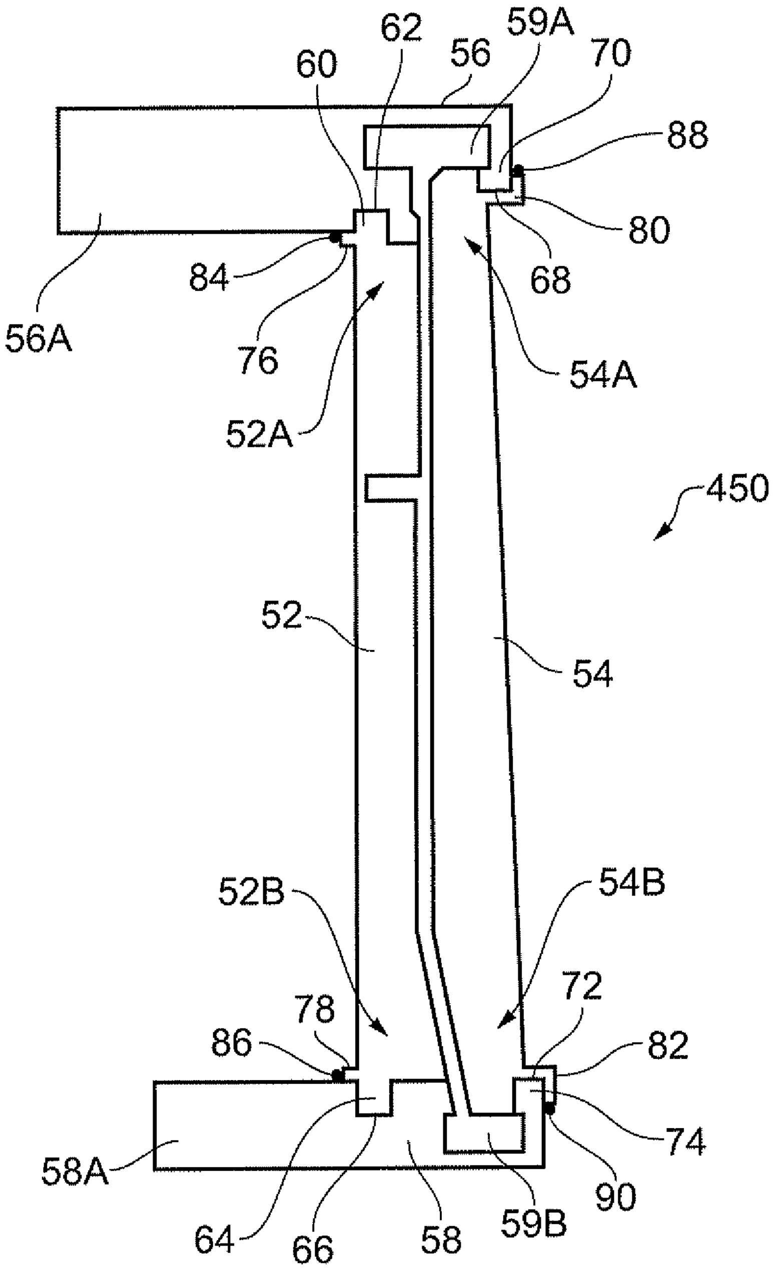
FIG. 5 is a longitudinal cross-sectional view through half of an additional hot isostatic pressing tool according to the present invention.

The combustor casing 32 may be manufactured using a hot isostatic pressing tool 450 as shown in FIG. 5. The hot isostatic pressing tool 450 is substantially the same as that shown in FIG. 1 and like parts are denoted by like numerals. The interlocking features of the first end ring 56 and the first end 52A of the inner cylindrical canister member 52 comprise an annular axially extending projection 60 on the inner cylindrical canister member 52 and an annular groove 62 in the first end ring 56. The interlocking features 60 and 62 form a series of Z-shaped leakage flow paths between the first end ring 56 and the first end 52A of the inner cylindrical canister member 52. The first end 52A of the inner cylindrical canister member 52 has a radially inwardly extending membrane 76 abutting the first end ring 56. The interlocking features of the first end ring 56 and the first end 54A of the outer cylindrical canister member 54 comprise an annular axially extending projection 70 on the first end ring 56 and an annular groove 68 in the first end 54A of the outer cylindrical canister member 54. The interlocking features form a U-shaped leakage flow path between the first end ring 56 and the first end 54A of the outer cylindrical canister member 54. The first end 54A of the outer cylindrical canister member 54 has a radially outwardly and axially extending membrane 80 abutting the annular projection 70 on the first end ring 56. The membrane 80 partially defines the annular groove 68. The interlocking features of the second end ring 58 and the second end 52B of the inner cylindrical canister member 52 comprise an annular axially extending projection 64 on the inner cylindrical canister member 52 and an annular groove 66 in the second end ring 58. The interlocking features 64 and 66 form a series of Z-shaped leakage flow paths between the second end ring 58 and the second end 52B of the inner cylindrical canister member 52. The second end 52B of the inner cylindrical canister member 52 has a radially inwardly extending membrane 78 abutting the second end ring 58. The interlocking features of the second end ring 58 and the second end 54B of the outer cylindrical canister member 54 comprise an annular axially extending projection 74 on the second end ring 58 and an annular groove 72 in the second end 54B of the outer cylindrical canister member 54. The interlocking features form a U-shaped leakage flow path between the second end ring 58 and the second end 54B of the outer cylindrical canister member 54. The second end 54B of the outer cylindrical canister member 54 has a radially outwardly and axially extending membrane 82 abutting the annular projection 72 on the second end ring 58. The hot isostatic pressing tool 450 differs from that in FIG. 1 in that the first end ring 56 has an annular portion 56A which extends in a radially inward direction to a radially inner diameter much less than the radially inner diameter of the inner cylindrical canister member 54 and the second end ring 58 has an annular portion 58A which extends in a radially inward direction to a radially inner diameter much less than the radially inner diameter of the inner cylindrical canister member 54. The annular portion 56A of the first end ring 56 and the annular portion 58A of the second ring 58 provide a large mass to the end rings 56 and 58 to resist radially outward or radially inward movement of the end rings 56 and 58 as the powder metal 61 in the chambers 59A and 59B is compacted and hence control the radially inner diameter of the hot isostatic pressing tool 450.

Figure 6:
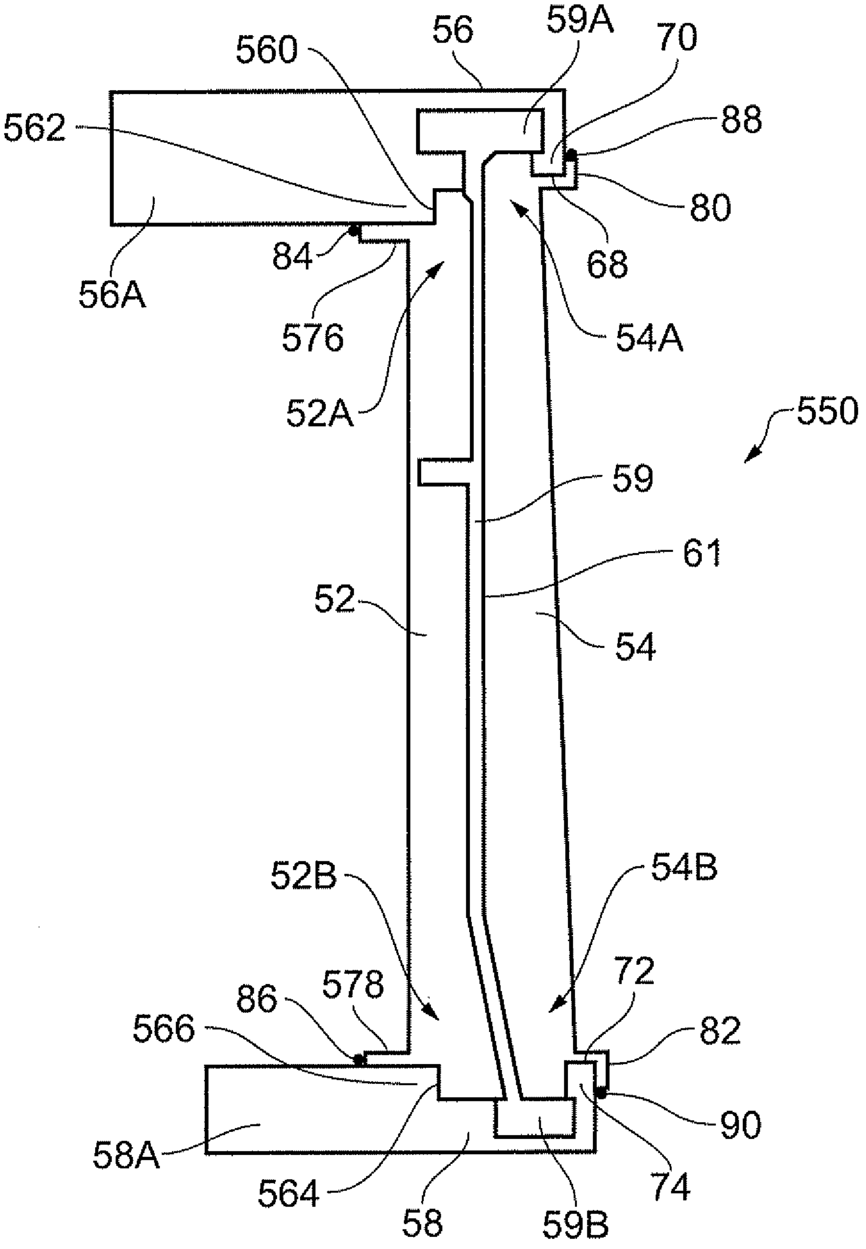
FIG. 6 is a longitudinal cross-sectional view through half of a further hot isostatic pressing tool according to the present invention.

The combustor casing 32 may be manufactured using a hot isostatic pressing tool 550 as shown in FIG. 6. The hot isostatic pressing tool 550 is substantially the same as that shown in FIG. 5 and like parts are denoted by like numerals. The hot isostatic pressing tool 550 is similar to that in FIG. 5 in that the first end ring 56 has an annular portion 56A which extends in a radially inward direction to a radially inner diameter much less than the radially inner diameter of the inner cylindrical canister member 54 and the second end ring 58 has an annular portion 58A which extends in a radially inward direction to a radially inner diameter much less than the radially inner diameter of the inner cylindrical canister member 54. The annular portion 56A of the first end ring 56 and the annular portion 58A of the second ring 58 provide a large mass to the end rings 56 and 58 to resist radially outward or radially inward movement of the end rings 56 and 58 as the powder metal 61 in the chamber 59A and 59B is compacted and hence control the radially inner diameter of the hot isostatic pressing tool 450. The hot isostatic pressing tool 550 differs to that in FIG. 5 in that the interlocking features of the first end ring 56 and the first end 52A of the inner cylindrical canister member 52 comprise an annular ledge 560 on the radially inner surface of the inner cylindrical canister member 52 and an annular axially extending projection 562 on the first end ring 56. The annular axially extending projection 562 rests on the annular ledge 560. The interlocking features 560 and 562 form a Z-shaped leakage flow paths between the first end ring 56 and the first end 52A of the inner cylindrical canister member 52. The first end 52A of the inner cylindrical canister member 52 has a radially inwardly and axially extending membrane 576 abutting the annular projection 562 on the first second end ring 56. The interlocking features of the second end ring 58 and the second end 52B of the inner cylindrical canister member 52 comprise an annular ledge 564 on the radially inner surface of the inner cylindrical canister member 52 and an annular axially extending projection 566 on the second end ring 58. The annular axially extending projection 566 rests on the annular ledge 564. The interlocking features 564 and 566 form a Z-shaped leakage flow paths between the second end ring 58 and the first end 52A of the inner cylindrical canister member 52. The second end ring 52B of the inner cylindrical canister member 52 has a radially inwardly and axially extending membrane 578 abutting the annular projection 566 on the second end ring 58.

Figure 9:
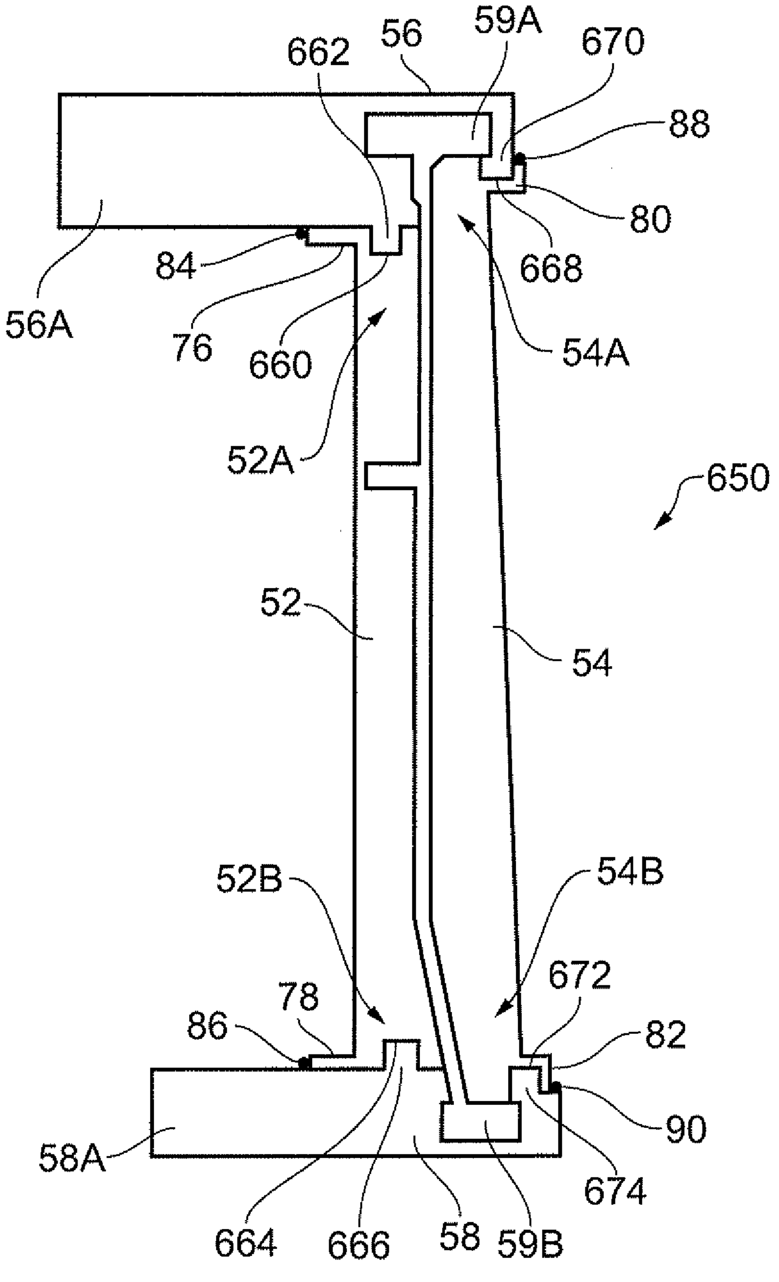
FIG. 9 is a longitudinal cross-sectional view through half of a further hot isostatic pressing tool according to the present invention.

The combustor casing 32 may be manufactured using a hot isostatic pressing tool 650 as shown in FIG. 9. The hot isostatic pressing tool 650 is substantially the same as that shown in FIG. 5 and like parts are denoted by like numerals. The hot isostatic pressing tool 650 is similar to that in FIG. 5 in that the first end ring 56 has an annular portion 56A which extends in a radially inward direction to a radially inner diameter much less than the radially inner diameter of the inner cylindrical canister member 54 and the second end ring 58 has an annular portion 58A which extends in a radially inward direction to a radially inner diameter much less than the radially inner diameter of the inner cylindrical canister member 54. The annular portion 56A of the first end ring 56 and the annular portion 58A of the second ring 58 provide a large mass to the end rings 56 and 58 to resist radially outward or radially inward movement of the end rings 56 and 58 as the powder metal 61 in the chamber 59A and 59B is compacted and hence control the radially inner diameter of the hot isostatic pressing tool 450. The hot isostatic pressing tool 550 differs to that in FIG. 5 in that the interlocking features of the first end ring 56 and the first end 52A of the inner cylindrical canister member 52 comprise an annular axially extending projection 662 on the first end ring 56 and an annular groove 660 in the inner cylindrical canister member 52. The interlocking features 660 and 662 form a series of Z-shaped leakage flow paths between the first end ring 56 and the first end 52A of the inner cylindrical canister member 52. The first end 52A of the inner cylindrical canister member 52 has a radially inwardly extending membrane 76 abutting the first end ring 56. The interlocking features of the second end ring 58 and the second end 52B of the inner cylindrical canister member 52 comprise an annular axially extending projection 666 on the second end ring 58 and an annular groove 664 in the inner cylindrical canister member 52. The interlocking features 664 and 666 form a series of Z-shaped leakage flow paths between the second end ring 58 and the second end 52B of the inner cylindrical canister member 52. The second end 52B of the inner cylindrical canister member 52 has a radially inwardly extending membrane 78 abutting the second end ring 58. The interlocking features of the second end ring 58 and the second end 54B of outer cylindrical canister member 54 comprise an annular axially extending projection 674 on the second end ring 58 and an annular groove 672 in the outer cylindrical canister member 54. The end of the membrane 82 abuts the second end ring 58. The interlocking features 672 and 674 form a Z-shaped leakage flow path between the second end ring 58 and the second end 54B of the outer cylindrical canister member 54.

Figure 10:
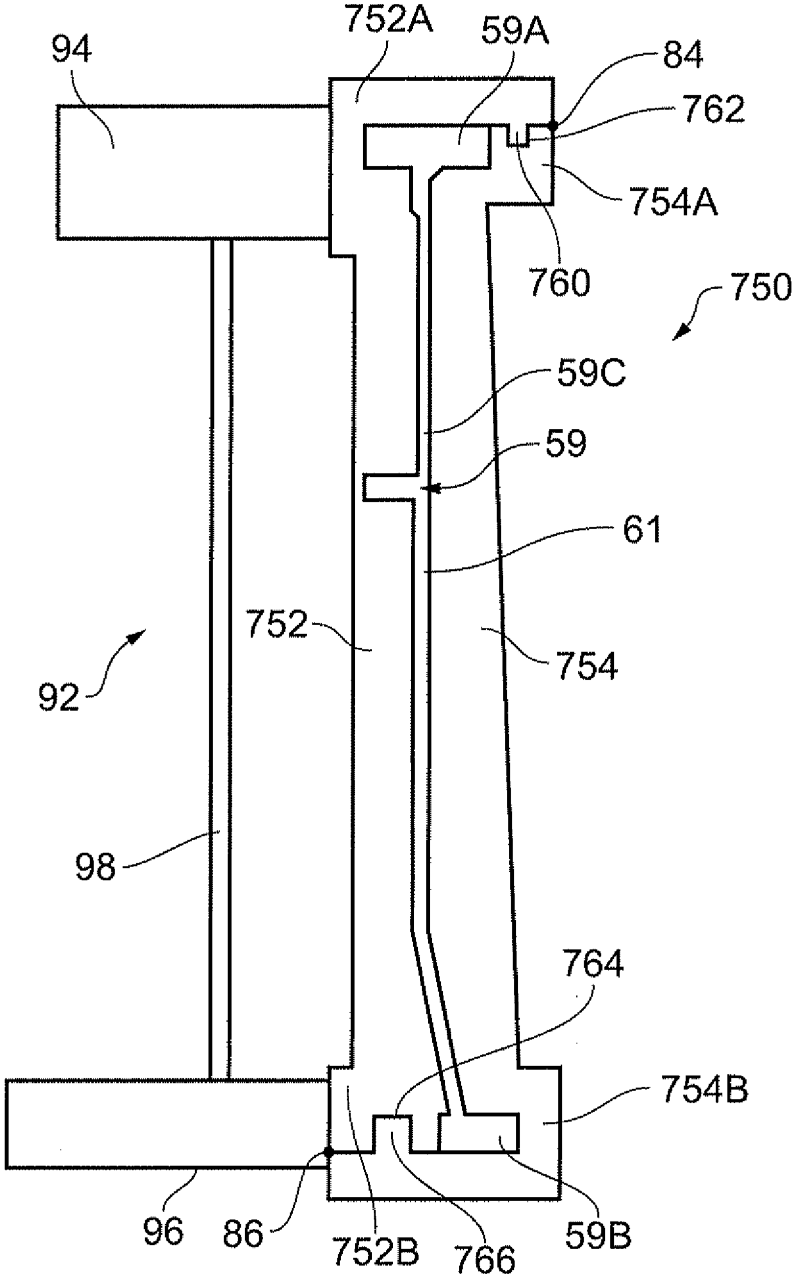
FIG. 10 is a longitudinal cross-sectional view through half of a further hot isostatic pressing tool according to the present invention.

The combustor casing 32 may be manufactured using a hot isostatic pressing tool 750 as shown in FIG. 10. The hot isostatic pressing tool 750 is similar to that shown in FIG. 5 and like parts are denoted by like numerals. The hot isostatic pressing tool 750 comprises a plurality of canister members 752 and 754 and the hot isostatic pressing tool 750 comprises at least one set of adjacent canister members. In this case a first end 752A of canister member 752 is adjacent a first end 754A of canister member 754 and a second end 752B of canister member 752 is adjacent a second end 754B of the canister member 754. The plurality of canister members 752 and 754 form, or define, a chamber 59 to receive a powder material 61 to be hot isostatically pressed. The at least one set of adjacent canister members 752 and 754 having interlocking features forming a U-shaped leakage flow path or a Z-shaped leakage flow path between the at least one set of adjacent second canister members. In this case the first end 752A of canister member 752 and the first end 754A of the adjacent canister member 754 have interlocking features 760 and 762 respectively and the second end 752B of canister member 752 and the second end 754B of the adjacent canister member 754 have interlocking features 764 and 766 respectively. The hot isostatic pressing tool 750 actually comprises an inner cylindrical canister member 752 and an outer cylindrical canister member 754 and the outer cylindrical canister member 754 is spaced radially outwardly from the inner cylindrical canister member 752 to form the chamber 59 to receive the powder material 61 to be hot isostatically pressed. The interlocking features 760 and 762 of the first end 752A of the inner cylindrical canister member 752 and the first end 754A of the outer cylindrical canister member 754 comprise an annular axially extending projection 760 on the first end 752A of the inner cylindrical canister member 752 and an annular groove 762 in the first end 754A of the outer cylindrical canister member 754. The interlocking features 760 and 762 form a series of Z-shaped leakage flow paths between the first end 752A of the inner cylindrical canister member 752 and the first end 754A of the outer cylindrical canister member 754. The interlocking features of the second end 752B of the inner cylindrical canister member 752 and the second end 754B of the outer cylindrical canister member 754 comprise an annular groove 764 in the second end 752B of the inner cylindrical canister member 752 and an annular axially extending projection 766 on the second end 754B of the outer cylindrical canister member 754. The interlocking features 764 and 766 form a series of Z-shaped leakage flow paths between the second end 752B of the inner cylindrical canister member 752 and the second end 754B of the outer cylindrical canister member 754. The interlocking features at the first ends 752A and 754A of the inner and outer cylindrical canister members 752 and 754 respectively may equally well form a simple Z-shaped leakage flow path or a U-shaped leakage flow path and the interlocking features at the second ends 752B and 754B of the inner and outer cylindrical canister members 752 and 754 respectively may equally well form a simple Z-shaped leakage flow path or a U-shaped leakage flow path.

The hot isostatic pressing tool 750 also comprises a support structure 92. The support structure 92 comprises a first annular support member 94, a second annular support member 96 and an axially extending support member 98 or a plurality of axially extending support members 98. The first annular support member 94 is located radially within the first annular sub portion 59A of the annular chamber 59 to support the first end 752A of the inner cylindrical canister member 752. The radially outer surface of the first annular support member 94 is radially within the radially inner surface of the first end 752A of the inner cylindrical canister member 752. The second annular support member 96 is located radially within the second annular sub portion 59B of the annular chamber 59 to support the second end 752B of the inner cylindrical canister member 752. The radially outer surface of the second annular support member 96 is radially within the radially inner surface of the second end 752B of the inner cylindrical canister member 752. The fit between the first and second annular support members 94 and 96 and the corresponding first and second end ends 752A and 752B of the inner cylindrical canister member 752 is such that at room temperature the support structure 92 is easily placed coaxially within the first and second ends 752A and 752B of the inner cylindrical canister member 752 but at the hot isostatic pressing temperature the relative thermal expansion of the first annular support member 94 and the first end 752A and the relative expansion of the second annular support member 96 and the second end 752B is such that the radially outer surface of the first annular support member 94 abuts the radially inner surface of the first end 752A and the radially outer surface of the second annular support member 96 abuts the radially inner surface of the second end 752B to control the radial positions of the first and second ends 752A and 752B and hence control the final positions and shape of the flanges 38 and 40 in the finished combustor casing 32. The first and second annular support members 94 and 96 extend in a radially inward direction to a radially inner diameter much less than the radially inner diameter of the inner cylindrical canister member 752.

The present invention may also comprise forming a cylindrical canister member, forming a first end member and forming a second end member, step b) comprises providing the first end member and a first end of the cylindrical canister member with interlocking features forming a U-shaped or a Z-shaped leakage flow path between the first end member and the first end of the cylindrical canister member, providing the second end member and a second end of the cylindrical canister member with interlocking features forming a U-shaped or a Z-shaped leakage flow path between the second end member and the second end of the cylindrical canister member, step c) comprise sealing the first end member to the first end of the cylindrical canister member and sealing the second end member to the second end of the cylindrical canister member to form a hot isostatic pressing tool, and step d) comprises supplying powder material into a chamber defined between the cylindrical canister member, the first end member and the second end member of the hot isostatic pressing tool.

The powder material may comprise a powder metal or a powder alloy. The powder alloy may comprise a nickel base superalloy, a titanium alloy, a steel alloy. The method may comprise supplying different powder alloys, or different powder metals, into different regions of the chamber.

The consolidated powder material article may be a casing. The casing may be a gas turbine engine casing. The casing may be a turbine casing, a compressor casing, a fan casing or a combustion casing.

The hot isostatic pressing tool may alternatively comprise a cylindrical canister member, a first end member and a second end member, the cylindrical canister member forming a chamber to receive a powder material to be hot isostatically pressed, the first end member and a first end of the cylindrical canister member having interlocking features forming a U-shaped or a Z-shaped leakage flow path between the first end member and the first end of the cylindrical canister member, the second end member and a second end of the cylindrical canister member having interlocking features forming a U-shaped or a Z-shaped leakage flow path between the second end member and the second end of the cylindrical canister member.

The canister members of the hot isostatic pressing tool of the present invention may be formed by machining forged mild steel rings which are then assembled to form the hot isostatic pressing tool. Alternatively the canister members of the hot isostatic pressing tool of the present invention may be formed by casting or may be produced by hot isostatic pressing of powder metal. The canister members may comprise mild steel, preferably mild steel comprising 2 wt % carbon. All the internal surfaces of the canister members which contact powder material, metal or alloy, are machined accurately to enable the production of a precise nett shape article and the interlocking features forming the U-shaped or Z-shaped leakage flow path are machined accurately to ensure integrity during the hot isostatic pressing process. The internal surfaces of the canister members which contact powder material, metal or alloy, may be provided with a barrier layer to inhibit the diffusion of carbides and ferrites from the mild steel canister members into the powder material, metal or alloy e.g. nickel base superalloy, during the hot isostatic pressing procedure. The barrier layer may comprise a nickel alloy, boron nitride or yttria.

In all of the embodiments of the present invention the interlocking features of the adjacent canister members form a U-shaped, a Z-shaped or a series of Z-shaped leakage flow paths. In the case of FIGS. 1 and 5 there are two U-shaped leakage flow paths and two leakage flow paths comprising a series of Z-shaped leakage flow paths. In the case of FIG. 2 there are four leakage flow paths comprising a series of Z-shaped leakage flow paths. In the case of FIG. 3 there are three U-shaped leakage flow paths and one leakage flow path comprising a U-shaped leakage flow path and an additional perpendicular portion. In the case of FIGS. 4 and 6 there are two U-shaped leakage flow paths and two Z-shaped flow paths. In the case of FIG. 9 there is one U-shaped leakage flow path, two leakage flow paths comprising a series of Z-shaped leakage flow paths and one leakage flow path comprising a U-shaped leakage flow path and an additional perpendicular portion. In the case of FIG. 10 there are two leakage flow paths comprising a series of Z-shaped leakage flow paths. The interlocking features of the adjacent canister members can be considered to form a leakage flow path comprising three straight lines interconnected by two right angle bends in the case of a U-shaped leakage flow path and a Z-shaped leakage flow path. The interlocking features of the adjacent canister members can be considered to form a leakage flow path comprising five straight lines interconnected by four right angle bends in the case of a leakage flow path comprising a series of Z-shaped leakage flow paths. The interlocking features of the adjacent canister members can be considered to form a leakage flow path comprising four straight lines and three right angle bends in the case of a leakage flow path comprising a U-shaped leakage flow path and an additional perpendicular portion.

Although the present invention has been specifically described with respect to canisters comprising two, three or four canister members it is equally applicable to a canister comprising two or more canister members.

Although the present invention has been described with reference to an annular chamber having cylindrical, conical or frustoconical inner and outer surfaces, e.g. which are circular in cross-section, the present invention may also be applicable to other annular chambers which have polygonal inner and outer surfaces, e.g. square, pentagonal, hexagonal, octagonal etc in cross-section.

Although the present invention has been described with reference to a hot isostatic pressing tool for producing a gas turbine engine casing it may be suitable for a hot isostatic pressing tool for producing casings for other engines, or for producing other articles or apparatus.

The invention claimed is:

1. A hot isostatic pressing tool comprising a plurality of canister members, the hot isostatic pressing tool comprising at least one set of adjacent canister members, the plurality of canister members forming a chamber to receive a powder material to be hot isostatically pressed, the at least one set of adjacent canister members having interlocking features forming a U-shaped or a Z-shaped leakage flow path between the at least one set of adjacent canister members.

2. A hot isostatic pressing tool as claimed in claim 1 comprising an inner cylindrical canister member, an outer cylindrical canister member, a first end ring and a second end ring, the outer cylindrical canister member being spaced radially outwardly from the inner cylindrical canister member to form the chamber to receive a powder material to be hot isostatically pressed, the inner cylindrical canister member having a first end and a second end and the outer cylindrical canister member having a first end and a second end, the first end ring and the first end of the inner cylindrical canister member having interlocking features forming a U-shaped or a Z-shaped leakage flow path between the first end ring and the first end of the inner cylindrical canister member, the second end ring and the second end of the inner cylindrical canister member having interlocking features forming a U-shaped or a Z-shaped leakage flow path between the second end ring and the second end of the inner cylindrical canister member, the first end ring and the first end of the outer cylindrical canister member having interlocking features forming a U-shaped or a Z-shaped leakage flow path between the first end ring and the first end of the outer cylindrical canister member, and the second end ring and the second end of the outer cylindrical canister member having interlocking features forming a U-shaped or a Z-shaped leakage flow path between the second end ring and the second end of the outer cylindrical canister member.

3. A hot isostatic pressing tool as claimed in claim 2 wherein the interlocking features of the first end ring and a first end of the inner cylindrical canister member comprising an annular axially extending projection on the inner cylindrical canister member and an annular groove in the first end ring, the interlocking features forming a series of Z-shaped leakage flow paths between the first end ring and the first end of the inner cylindrical canister member.

4. A hot isostatic pressing tool as claimed in claim 2 wherein the interlocking features of the second end ring and a second end of the inner cylindrical canister member comprising an annular axially extending projection on the inner cylindrical canister member and an annular groove in the second end ring, the interlocking features forming a series of Z-shaped leakage flow paths between the second end ring and the second end of the inner cylindrical canister member.

5. A hot isostatic pressing tool as claimed in claim 2 wherein the interlocking features of the first end ring and the first end of the outer cylindrical canister member comprising an annular axially extending projection on the first end ring and an annular groove in the first end of the outer cylindrical canister member, the interlocking features forming a U-shaped leakage flow path between the first end ring and the first end of the outer cylindrical canister member.

6. A hot isostatic pressing tool as claimed in claim 2 wherein the interlocking features of the second end ring and the second end of the outer cylindrical canister member comprising an annular axially extending projection on the second end ring and an annular groove in the second end of the outer cylindrical canister member, the interlocking features forming a U-shaped leakage flow path between the second end ring and the second end of the outer cylindrical canister member.

7. A hot isostatic pressing tool as claimed in claim 3 wherein the first end of the inner cylindrical canister member having a radially inwardly extending membrane abutting the first end ring.

8. A hot isostatic pressing tool as claimed in claim 4 wherein the second end of the inner cylindrical canister member having a radially inwardly extending membrane abutting the second end ring.

9. A hot isostatic pressing tool as claimed in claim 5 wherein the first end of the outer cylindrical canister member having a radially outwardly and axially extending membrane abutting the annular projection on the first end ring.

10. A hot isostatic pressing tool as claimed in claim 6 wherein the second end of the outer cylindrical canister member having a radially outwardly and axially extending membrane abutting the annular projection on the second end ring.

11. A hot isostatic pressing tool as claimed in claim 2 wherein the first end ring being hollow and defining a sub chamber interconnected with the chamber to receive the powder material to be hot isostatically pressed.

12. A hot isostatic pressing tool as claimed in claim 2 wherein the second end ring being hollow and defining a sub chamber interconnected with the chamber to receive the powder material to be hot isostatically pressed.

13. A hot isostatic pressing tool as claimed in claim 2 wherein the first end ring has an annular portion extending in a radially inward direction, the radially inner diameter of the annular portion is less than the radially inner diameter of the inner cylindrical canister member.

14. A hot isostatic pressing tool as claimed in claim 2 wherein the second end ring has an annular portion extending in a radially inward direction, the radially inner diameter of the annular portion is less than the radially inner diameter of the inner cylindrical canister member.

15. A hot isostatic pressing tool as claimed in claim 1 comprising a cylindrical canister member, a first end member and a second end member, the cylindrical canister member forming the chamber to receive a powder material to be hot isostatieally pressed, the cylindrical canister member having a first end and a second end, the first end member and the first end of the cylindrical canister member having interlocking features forming a U-shaped or a Z-shaped leakage flow path between the first end member and the first end of the cylindrical canister member, and the second end member and the second end of the cylindrical canister member having interlocking features forming a U-shaped or a Z-shaped leakage flow path between the second end member and the second end of the cylindrical canister member.

16. A hot isostatic pressing tool as claimed in claim 1 wherein the at least one set of adjacent canister members having interlocking features forming a series of Z-shaped leakage flow paths between the at least one set of adjacent canister members.

17. A method of manufacturing an article from powder material by hot isostatic pressing, the method comprising the steps of: — a) forming a plurality of canister members, b) providing interlocking features on an at least one set of adjacent canister members, the interlocking features forming a U-shaped or a Z-shaped leakage flow path between the at least one set of adjacent canister members, c) sealing the canister members together to form a hot isostatic pressing tool, d) supplying powder material into a chamber defined between the plurality of canister members of the hot isostatic pressing tool, e) evacuating gases from the chamber and then sealing the chamber, f) applying heat and pressure to consolidate the powder material within the chamber of the hot isostatic pressing tool to form a consolidated powder material article, and g) removing the hot isostatic pressing tool from the consolidated powder material article.

18. A method as claimed in claim 17 wherein step a) comprises forming an inner cylindrical canister member, forming an outer cylindrical canister member, forming a first end ring, forming a second end ring and arranging the outer cylindrical canister member such that it is spaced radially outwardly from the inner cylindrical canister member to form the chamber, step b) comprises providing the first end ring and a first end of the inner cylindrical canister member with interlocking features forming a U-shaped or a Z-shaped leakage flow path between the first end ring and the first end of the inner cylindrical canister member, providing the second end ring and a second end of the inner cylindrical canister member with interlocking features forming a U-shaped or a Z-shaped leakage flow path between the second end ring and the second end of the inner cylindrical canister member, providing the first end ring and a first end of the outer cylindrical canister member with interlocking features forming a U-shaped or a Z-shaped leakage flow path between the first end ring and the first end of the outer cylindrical canister member and providing the second end ring and a second end of the outer cylindrical canister member with interlocking features forming a U-shaped or a Z-shaped leakage flow path between the second end ring and the second end of the outer cylindrical canister member, step c) comprises sealing the first end ring to the first end of the inner cylindrical canister member, sealing the second end ring to the second end of the inner cylindrical canister member, sealing the first end ring to the first end of the outer cylindrical canister member and sealing the second end ring to the second end of the outer cylindrical canister member to form a hot isostatic pressing tool, and step d) comprises supplying powder material into the chamber between the inner cylindrical canister member and the outer cylindrical canister member of the hot isostatic pressing tool.

19. A method as claimed in claim 18 wherein the consolidated powder material article is a casing, the casing is selected from the group consisting of a gas turbine engine casing, a turbine casing, a compressor casing, a fan casing and a combustion casing.

20. A method as claimed in claim 17 wherein the powder material is selected from the group consisting of a powder metal and a powder alloy.

21. A method as claimed in claim 20 wherein the powder alloy is selected from the group consisting of a nickel base superalloy, a titanium alloy and a steel alloy.

22. A method as claimed in claim 20 comprising supplying different powder alloys into different regions of the chamber.

23. A hot isostatic pressing tool comprising an inner cylindrical canister member, an outer cylindrical canister member, a first end ring and a second end ring, the outer cylindrical canister member being spaced radially outwardly from the inner cylindrical canister member to form the chamber to receive a powder material to be hot isostatically pressed, the inner cylindrical canister member having a first end and a second end and the outer cylindrical canister member having a first end and a second end, the first end ring being hollow and defining a sub chamber of the chamber to receive the powder material to be hot isostatically pressed, the second end ring being hollow and defining a sub chamber of the chamber to receive the powder material to be hot isostatically pressed, the first end ring and the first end of the inner cylindrical canister member having interlocking features forming a U-shaped or a Z-shaped leakage flow path between the first end ring and the first end of the inner cylindrical canister member, the second end ring and the second end of the inner cylindrical canister member having interlocking features forming a U-shaped or a Z-shaped leakage flow path between the second end ring and the second end of the inner cylindrical canister member, the first end ring and the first end of the outer cylindrical canister member having interlocking features forming a U-shaped or a Z-shaped leakage flow path between the first end ring and the first end of the outer cylindrical canister member, and the second end ring and the second end of the outer cylindrical canister member having interlocking features forming a U-shaped or a Z-shaped leakage flow path between the second end ring and the second end of the outer cylindrical canister member.

* * * * *